US 6,655,745 B2

(12) United States Patent
Fohrenkamm et al.

(10) Patent No.: US 6,655,745 B2
(45) Date of Patent: Dec. 2, 2003

(54) EMERGENCY VEHICLE SEAT WITH INTEGRATED SEAT BELT

(75) Inventors: Jeremy A. Fohrenkamm, Eagle, WI (US); Paul C. Bostrom, Hartland, WI (US); Wayne R. Block, South Milwaukee, WI (US)

(73) Assignee: H.O. Bostrom Company, Inc., South Milwaukee, MI (US)

( * ) Notice: Subject to any disclaimer, the term of this patent is extended or adjusted under 35 U.S.C. 154(b) by 0 days.

(21) Appl. No.: 09/938,197

(22) Filed: Aug. 23, 2001

(65) Prior Publication Data

US 2003/0047971 A1 Mar. 13, 2003

(51) Int. Cl.[7] .................. A47C 7/62; A47C 7/02; A62B 35/00; B60R 21/00
(52) U.S. Cl. .................. 297/481; 297/483; 297/188.04; 297/452.2
(58) Field of Search ................. 297/481, 483, 297/188.04, 452.2

(56) References Cited

U.S. PATENT DOCUMENTS

| 2,710,649 | A | * | 6/1955 | Griswold et al. ........... 297/483 |
| 3,471,197 | A | | 10/1969 | Ely |
| 3,695,696 | A | | 10/1972 | Lohr et al. |
| 3,877,748 | A | | 4/1975 | Eggert |
| 3,971,591 | A | * | 7/1976 | Ziaylek ................ 297/188.04 |
| 4,592,592 | A | | 6/1986 | Peek ...................... 297/483 |
| 4,804,226 | A | | 2/1989 | Schmale ................ 297/483 X |
| 5,022,677 | A | | 6/1991 | Barbiero ................ 297/483 X |
| 5,213,392 | A | * | 5/1993 | Bostrom et al. ..... 297/188.04 X |
| 5,246,271 | A | * | 9/1993 | Boisset ................ 297/452.2 X |
| 5,253,924 | A | | 10/1993 | Glance ................ 297/483 X |
| 5,275,462 | A | * | 1/1994 | Pond et al. ............ 297/188.04 |
| 5,354,029 | A | * | 10/1994 | Ziaylek et al. ...... 297/188.04 X |
| 5,362,132 | A | * | 11/1994 | Griswold et al. .... 297/452.2 X |
| 5,364,170 | A | | 11/1994 | West ...................... 297/483 |
| 5,390,982 | A | | 2/1995 | Johnson et al. ........ 297/483 X |
| 5,411,319 | A | * | 5/1995 | Kuiri ...................... 297/483 |
| 5,439,272 | A | | 8/1995 | Hallet et al. |
| 5,441,332 | A | | 8/1995 | Verellen ................ 297/483 |
| 5,452,941 | A | * | 9/1995 | Halse et al. ......... 297/452.2 X |
| 5,599,070 | A | * | 2/1997 | Pham et al. ............ 297/483 |
| 5,645,316 | A | * | 7/1997 | Aufrere et al. ...... 297/452.2 X |
| 5,658,051 | A | * | 8/1997 | Vega et al. ............ 297/483 |
| 5,681,080 | A | * | 10/1997 | Pond et al. ......... 297/188.04 X |
| 5,697,670 | A | | 12/1997 | Husted et al. ............ 297/483 |
| 5,722,731 | A | | 3/1998 | Chang ................. 297/452.2 V |
| 5,746,476 | A | * | 5/1998 | Novak et al. ........ 297/452.2 X |
| 5,803,544 | A | | 9/1998 | Block et al. ......... 297/188.04 X |
| 5,851,055 | A | | 12/1998 | Lewis ...................... 297/483 |
| 5,934,749 | A | * | 8/1999 | Pond et al. ............ 297/188.04 |
| 5,971,490 | A | | 10/1999 | Chang ................ 297/452.2 X |
| 5,988,758 | A | * | 11/1999 | Heintzelman et al. ...... 297/483 |
| 5,988,759 | A | * | 11/1999 | Bauer et al. .............. 297/483 |
| 6,045,186 | A | | 4/2000 | Butt et al. ............ 297/483 X |
| 6,048,034 | A | | 4/2000 | Aumont et al. ........ 297/481 X |

FOREIGN PATENT DOCUMENTS

WO    WO 97/44211    11/1997

\* cited by examiner

*Primary Examiner*—Rodney B. White
(74) *Attorney, Agent, or Firm*—Andrus, Sceales, Starke & Sawall, LLP

(57) ABSTRACT

An emergency conveyance seat includes a frame for supporting a seat cushion and a back cushioning arrangement. The frame includes a pair of spaced apart channels connected by an enclosure adapted to receive a self-contained breathing apparatus. The channels provide attachment structure for mounting the back cushioning arrangement thereon. One of the channels provides a protective housing for an elongated seat belt webbing having one end attached to a retractor positioned within the channel and a second end attached to a lower portion of the frame.

11 Claims, 6 Drawing Sheets

US 6,655,745 B2

EMERGENCY VEHICLE SEAT WITH INTEGRATED SEAT BELT

FIELD OF THE INVENTION

This invention relates broadly to vehicle seat construction, and, more particularly, pertains to the integration of a seat belt into an emergency vehicle seat.

BACKGROUND OF THE INVENTION

Seats of emergency vehicles, as with other passenger vehicles, are required to include some type of seat belt assembly which fits across the upper torso of a seat occupant for helping to restrain the seat occupant in the event of an accident. Such seat belt assemblies are typically remotely secured to various anchorage points of the vehicle's body.

When using emergency vehicle seats, such as those which store a self-contained breathing apparatus (SCBA), it is often necessary to change the position of the seat within the emergency vehicle cab. However, the existing anchoring of the seat belt to the vehicle sometimes make it more difficult to access and use because of this remote placement off the seat. In addition, the existing anchoring of the seat limits the flexibility in cab design of the emergency vehicle.

Accordingly, it is desirable to replace existing emergency vehicle seating systems that use a seat with a remote mounted seat belt to make seating placement more flexible and remove separate safety belt anchorage points on the vehicle. It is further desirable to integrate a seat belt into an emergency vehicle seat frame which is designed to protect the seat belt path and provide attachment points for belt rollers and a clip on cushioning arrangement which enhances the comfort of a seat occupant while preserving the aesthetics on the rear of the seat.

SUMMARY OF THE INVENTION

The present invention is directed to an improved seat construction that has particular application for use in a fire truck or other rescue or emergency conveyance vehicle. The seat advantageously provides both the safety and comfort of the seat occupant whether or not an SCBA is installed to the rear of the seat. The invention is a cost-effective solution for securing an occupant of the emergency vehicle to a seat during transit.

It is a general object of the present invention to provide an integrated seat belt for an emergency vehicle.

It is one object of the present invention to provide an emergency vehicle seat frame for protectively mounting a seat belt wherein the frame has multi-functional channels.

It is also an object of the present invention to provide an emergency vehicle seat which combines an integral seat belt with a removable cushion arrangement on the back of the seat.

It is a further object of the present invention to provide an integral seat belt structure for an emergency vehicle which is easy to access and use irregardless of the changing position of the seat in the vehicle.

It is another object of the present invention to provide an emergency vehicle seat with a symmetrical frame which will allow placement of the seat either on the driver or passenger side of the vehicle, and which will permit locating a seat belt in a channel on either side of the seat.

In one aspect of the invention, a seat has a tubular frame for supporting a seat cushion and a back spaced apart cushioning arrangement, and an enclosure connected to the frame adapted to store a self-contained breathing unit therein. The invention is improved by a seat belt structure integrated into the seat and having a first run protectively enclosed inside the frame and a second run extending along the back cushioning arrangement. The attachment structure is disposed internally of the frame for enabling removable mounting of the back cushioning arrangement. The frame member includes a pair of spaced apart channels, each being C-shaped in cross section and having a pair of inner and outer side walls connected by a rear wall so that each channel is open at a forward end thereof. Each of the channels has a bar extending transversely across the side walls and the bar provides a mounting surface for upper hook structure on the back cushioning arrangement. Each of the channels also has a brace extending downwardly and forwardly therefrom and providing a support surface for lower hook structure on the back cushioning arrangement. The back cushioning arrangement is comprised of a pair of bolsters, each extending substantially the entire height of one of the channels, and a pair of side cushions, each being received in a recess formed in a respective bolster. A pair of cages is mounted upon top ends of the channels, one cage having a rotating bezel with a guide slot for guiding the seat belt structure therethrough. The channels have symmetrical structure such that the first run of the seat belt structure may be positioned in either of the channels. Each of the channels has increasing cross section from top to bottom.

In another aspect of the invention, an emergency conveyance seat includes a frame for supporting a seat cushion and a back cushioning arrangement. The frame includes a pair of spaced apart channels connected by an enclosure adapted to receive a self-contained breathing unit. The channels provide attachment structure for mounting the back cushioning arrangement thereon. One of the channels provides a protective housing for an elongated seat belt webbing having one end attached to a retractor positioned within the channel and a second end connected to a lower portion of the frame. The back cushioning arrangement is removably connected to the channels by clip-on structure cooperable with the attachment structure. The top end of one channel is provided with a rotatably mounted slotted cage for guiding seat webbing therethrough.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
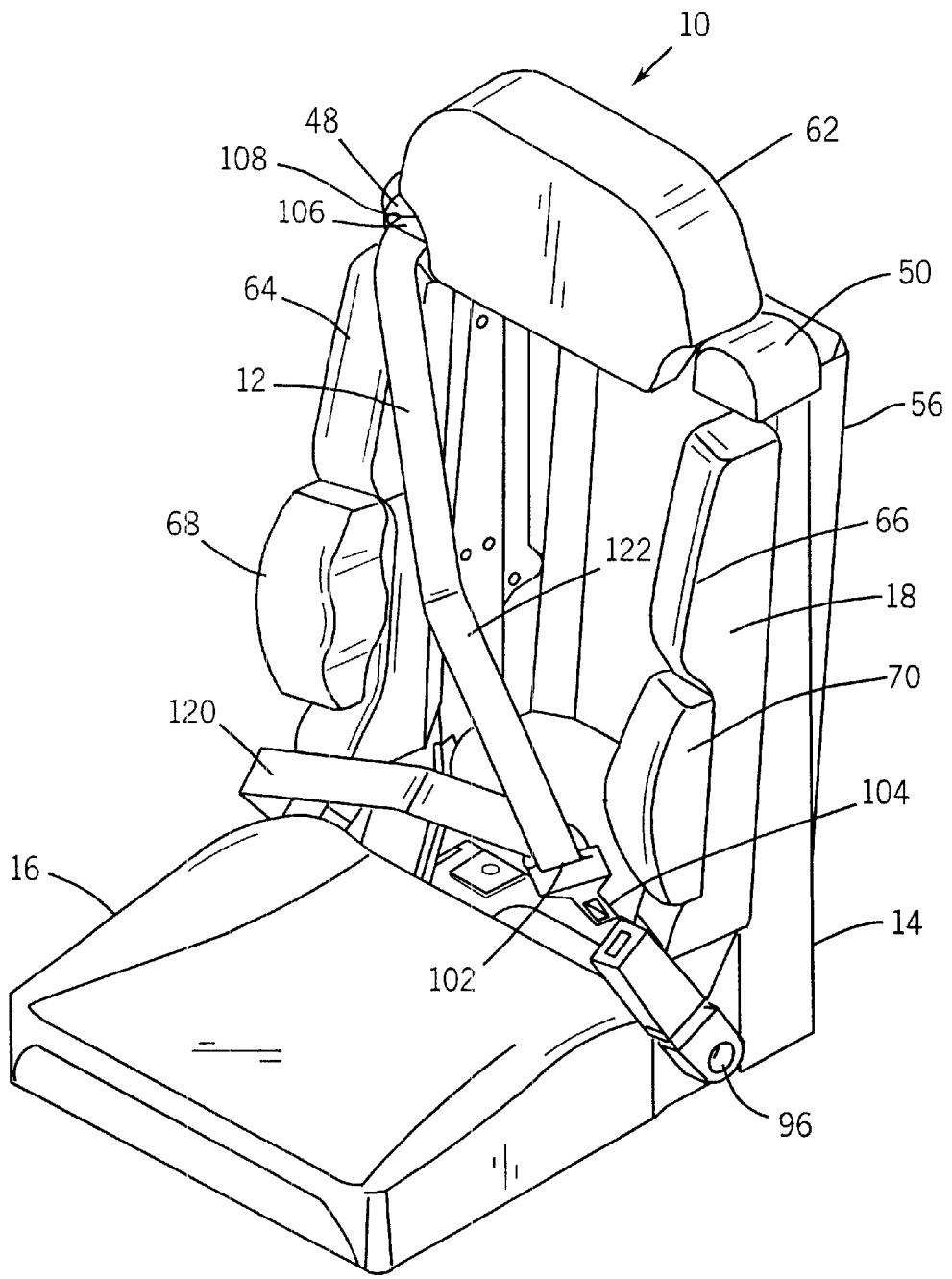
FIG. 1 is a top isometric view of the emergency vehicle seat embodying the invention.

Referring now to the drawings, there is shown an emergency vehicle seat 10 with an integral seat belt structure 12 which has particular utility in fire and rescue vehicles. The seat 10 includes a frame 14 for supporting a base in the form of a seat cushion 16, and a back in the form of a removable cushion arrangement 18. Seat cushion 16 can be fixed in place (as shown in the figures), or can be mounted for flip-up movement relative to the back. For purposes of reference, the terms left side and right side will be defined from the viewpoint of one occupying the seat 10.

Figure 7:
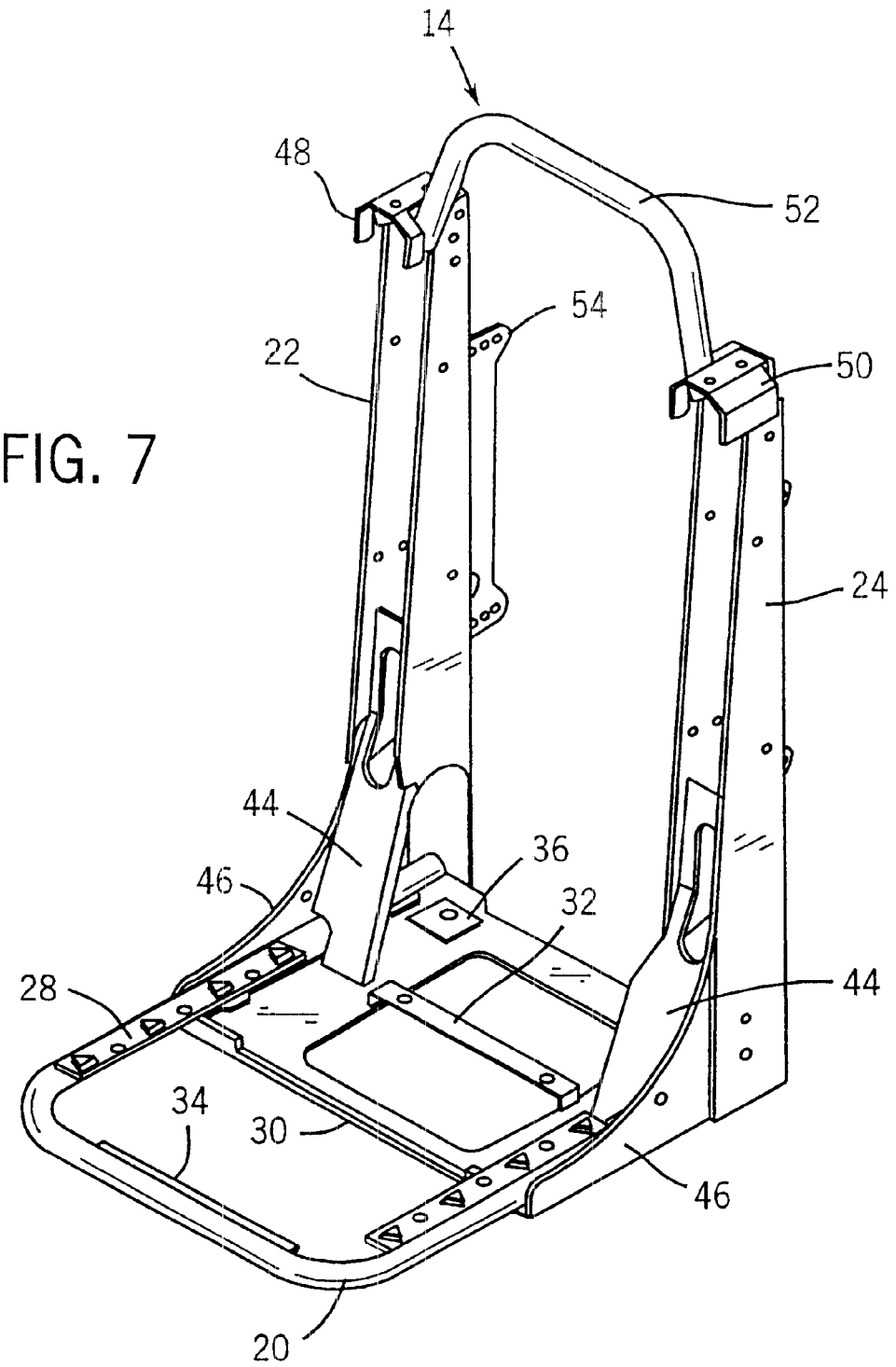
FIG. 7 is a top isometric view of a frame employed in the emergency vehicle seat shown in FIG. 1.

Referring now to FIG. 7, frame 14 has a symmetrical construction including a generally U-shaped, horizontally extending seat tube 20 connected at its rearward ends to a pair of spaced apart, vertically ascending channels 22, 24. Seat tube 20 is provided with a pair of spring strips 26, 28 along the left and right sides, and a mounting plate 30 which extends across the width of the seat tube 20 between the channels 22, 24. Mounting plate 30 is formed with a rear cushion attachment bracket 32 which cooperates with a front cushion attachment bracket 34 on a bight portion of the seat tube 20. Mounting plate 30 also has a pair of reinforcement plates (one being seen at 36) at the rear corners thereof. The seat tube 20 with its spring strips 26, 28 and mounting plate 30 define a support platform for the seat cushion 16.

Figure 5:
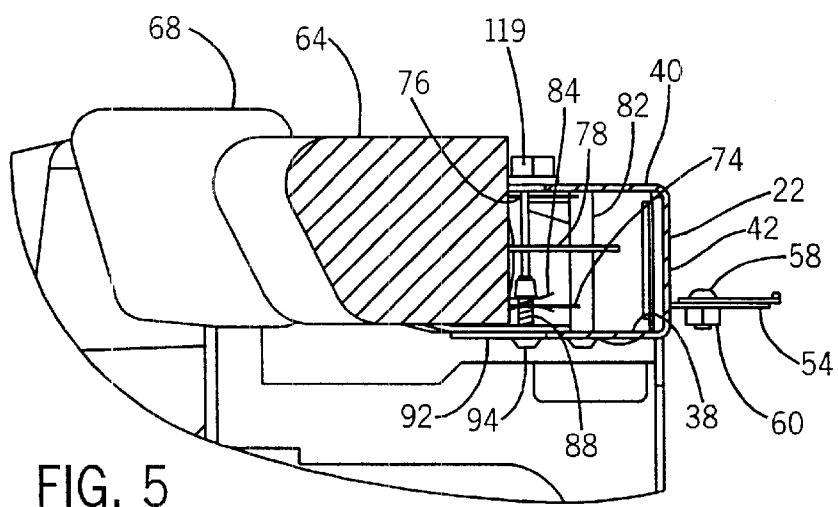
FIG. 5 is a fragmentary, sectional view taken on line 5—5 of FIG. 4.
Figure 6:
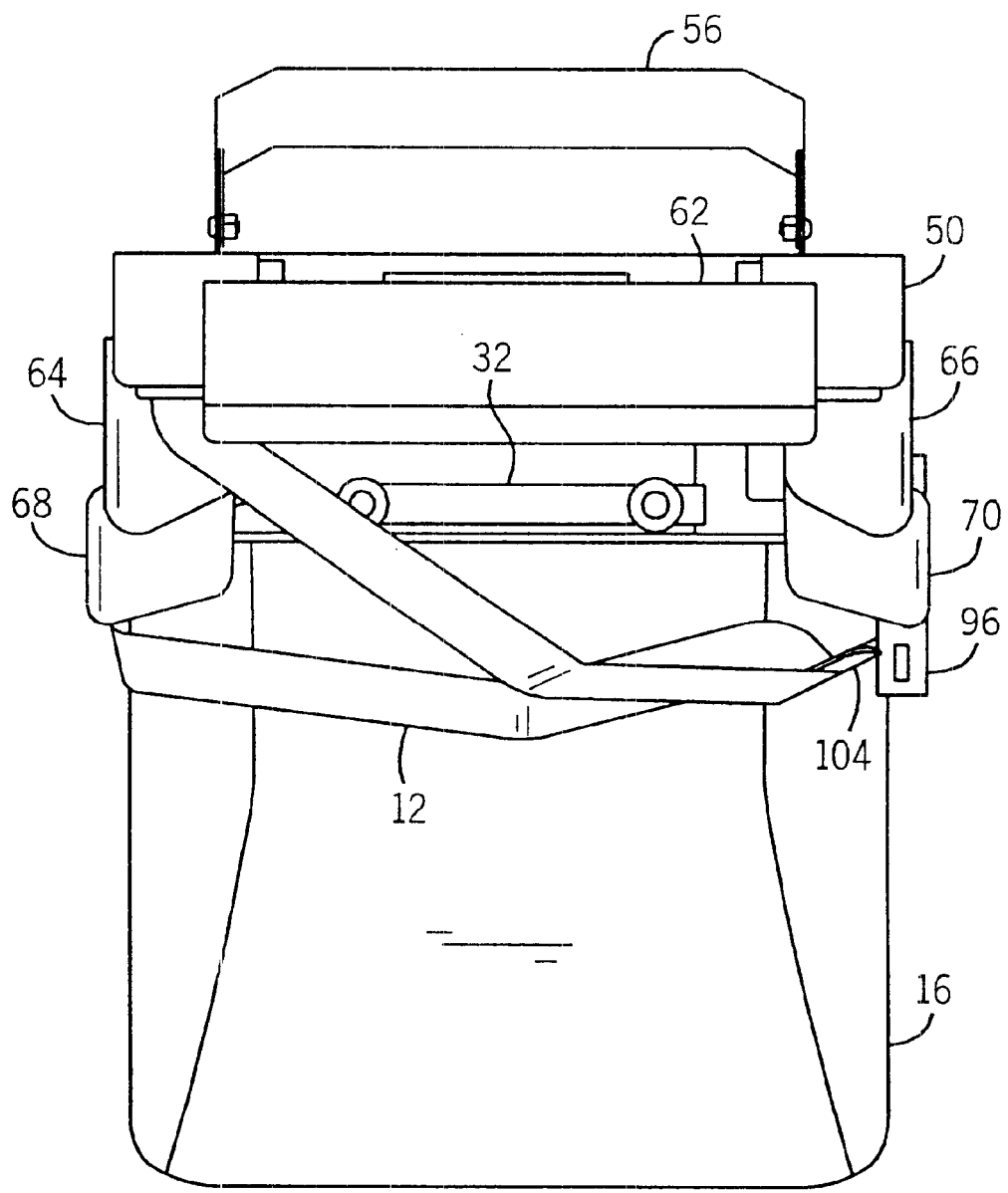
FIG. 6 is a plan view of the emergency vehicle seat shown in FIG. 1.

Each of the frame channels 22, 24 is C-shaped in cross section 50 that each is open at a forward end thereof. Each channel 22, 24 has a pair of inner and outer side walls 38, 40 connected by a rear wall 42. The lower end of each frame channel 22, 24 includes a downwardly and forwardly projecting brace 44 which lies on an inside surface of a curved gusset 46 interconnecting and rigidifying the lower outer and inner wall of each channel 22, 24 along a respective rear side of the seat tube 20. The top ends of the frame channels 22, 24 carry a pair of curved, padded seat belt cages 48, 50 between which an inverted, U-shaped head rest tube 52 is mounted. Extending rearwardly from the rear wall 42 of each frame channel 22, 24 is a shroud mounting plate 54 for supporting a shroud 56 as seen in FIGS. 2, 3, 4 and 6, such as by a bolt 58 and nut 60 (FIG. 5). As is well known, the shroud 56 provides a cavity for accommodating or storing the cylinder of a self-contained breathing apparatus (SCBA) such as used in rescue operations to provide oxygen. Alternatively, if the seat 10 does not require a cavity for storage purposes, the cavity may be fitted with suitable padded back support. Movably connected to the head rest tube 52 between the seat belt cages 48, 50 is a head pad 62 which is urged or biased to a head supporting position as more fully disclosed in Bostrom et al. U.S. Pat. No. 5,213,392.

Figure 3:
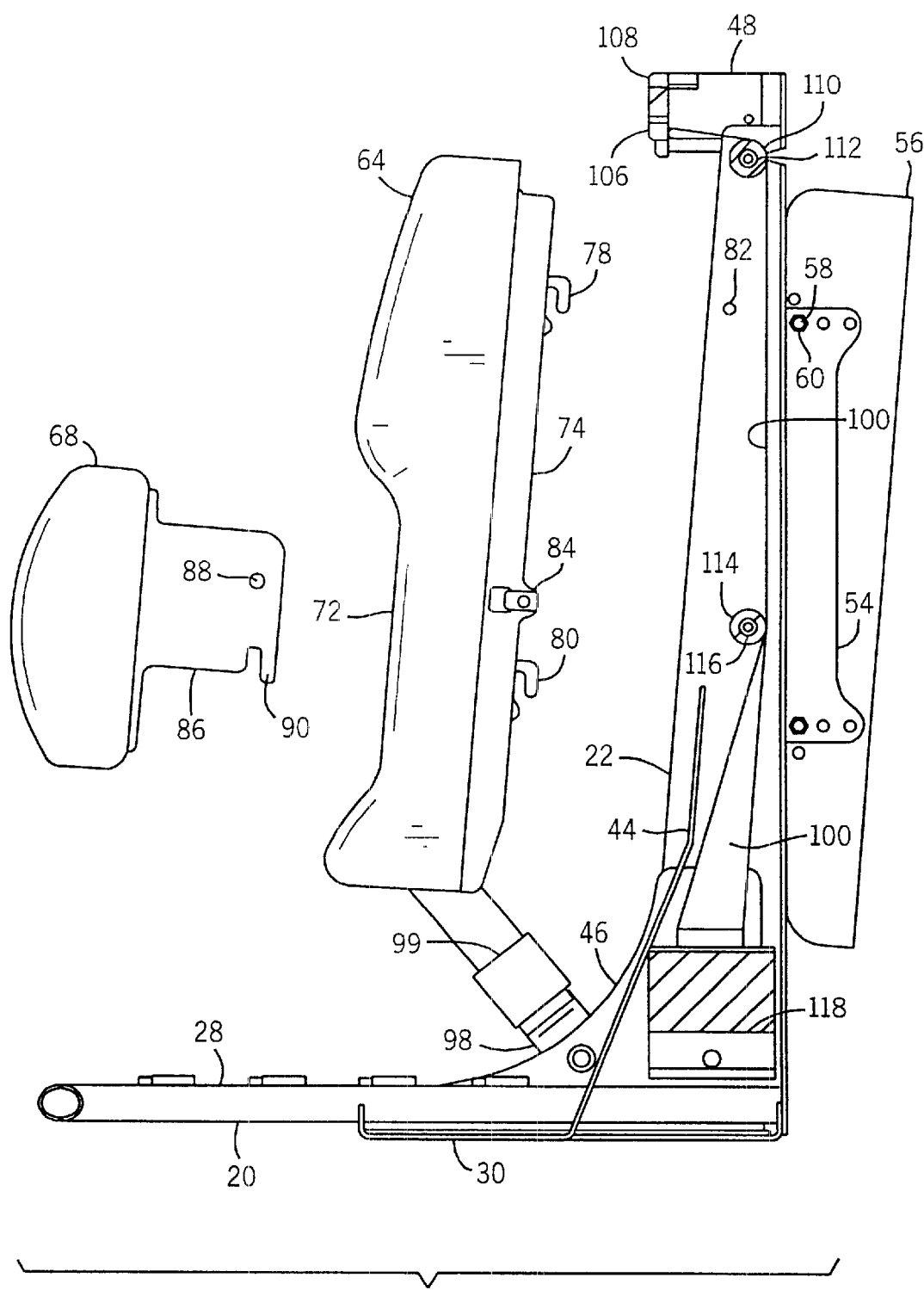
FIG. 3 is a fragmentary, exploded view, in partial cross section, taken on line 3—3 of FIG. 2.
Figure 4:
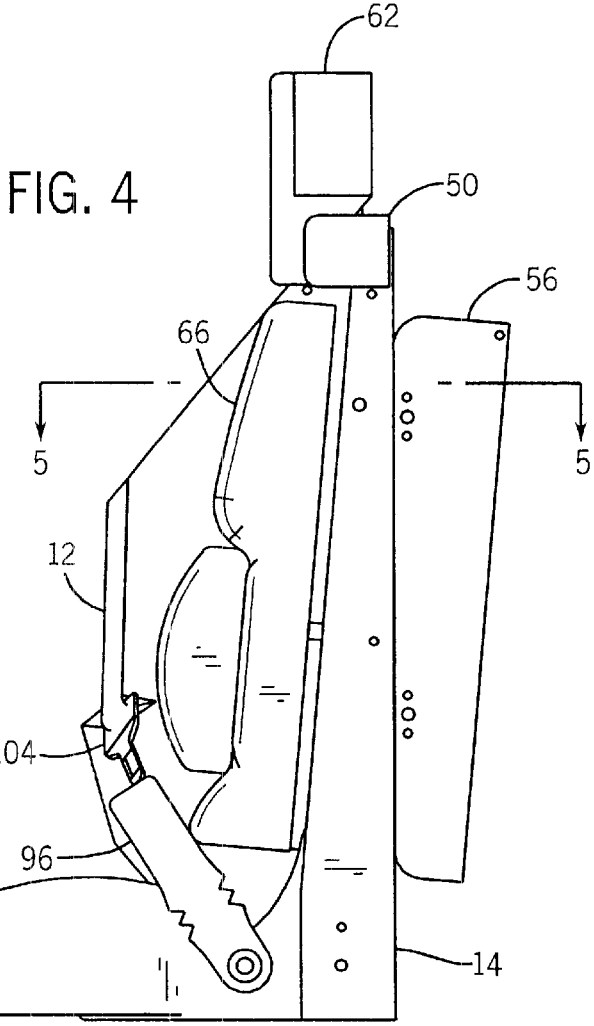
FIG. 4 is a left side view of the emergency vehicle seat shown in FIG. 1.

The removable cushion arrangement 18 forming the back of seat 10 is comprised of a pair of elongated, spaced apart, removable side members or bolsters 64, 66, and a pair of removable side cushions 68, 70. Each bolster 64, 66 includes a foam element and a plastic or fabric coating secured around the foam element and is formed with a forwardly facing recess 72 for receiving a respective side cushion 68, 70 therein as set forth in Block et al. U.S. Pat. No. 5,803,544. As best seen in FIGS. 3 and 5, the rear end of each bolster 64, 66 is provided with a pair of parallel bolster channels 74, 76 disposed to fit between the side walls 38, 40 of each frame channel 22, 24 and a pair of upper and lower hook tabs 78, 80 to facilitate clip-on connection of the bolsters 64, 66 to the frame channels 22, 24. Each upper hook tab 78 is engageable with a bolster bar 82 extending transversely across the side walls 38, 40 of each frame channel 22, 24. Each lower hook tab 80 is engageable over the top of the brace 44 in each frame channel 22, 24. The innermost bolster channel 74 on each bolster 64, 66 carries a threaded U-nut 84 which is used to secure each bolster 64, 66 and side cushion 68, 70 to its respective frame channel 22, 24 as will be detailed below.

Each side cushion 68, 70 also includes a foam element and a plastic or fabric covering secured around the foam element and is provided with a bracket 86 having a through-hole 88 formed therein and a hook tab 90. As illustrated in FIG. 5, each bracket 86 is designed to lie on the inside surface of its accompanying bolster 64, 66 so that the throughhole 88 is aligned with an opening 92 on the innermost side wall of each frame channel 22, 24 and the U-nut 84. A fastener 94 is passed through the frame channel opening 92, the side cushion bracket throughhole 88 and is then threaded into the U-nut 84. The hook tab 90 on each side cushion 68, 70 is engageable over the top of a respective brace 44.

Figure 2:
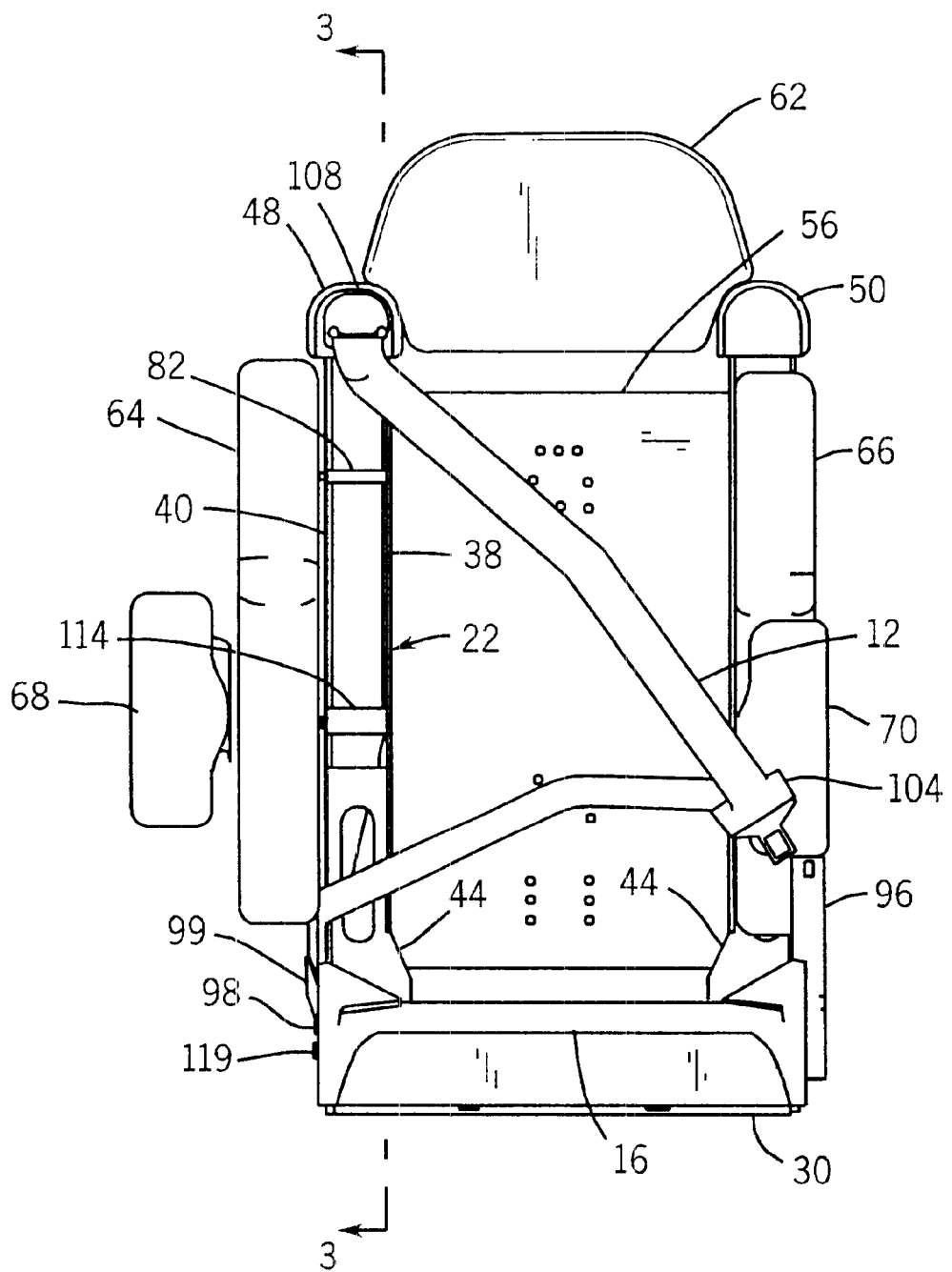
FIG. 2 is a front elevational view, with certain parts broken away, of the emergency vehicle seat shown in FIG. 1.

A salient feature of the invention resides in the incorporation of integral seat belt structure 12 in the emergency conveyance seat 10. Referring to FIGS. 1 through 3, the seat belt structure 12 includes a buckle 96 which is anchored to the gusset 46 on the left side of the seat 10, and an anchorage plate 98 secured on the gusset 46 on the right side of the seat 10 for mounting a sleeved end 99 of an elongated safety belt webbing 100. The webbing 100 passes through an elongated recess 102 in a movable tongue 104 and extends upwardly through a guide slot 106 in a bezel 108 rotatably mounted in the cage 48 on the top end of the right side frame channel 22. This initial path of webbing 100 defines an external belt run which extends along the back cushioning arrangement 64, 66, 68, 70 as seen in FIGS. 1 and 2. Thereafter, the webbing 100 passes rearwardly over an upper guide roller 110 mounted for rotation on a first pivot pin 112 extending across the side walls 38, 40 at the top of the right side frame channel 22. The webbing 100 then runs downwardly adjacent the rear wall 42 of the right side frame channel 22 and behind a lower guide roller 114 mounted for rotation on a second pivot pin 116 extending transversely across the right frame channel 22 approximately midway between the top end and the bottom end of right side frame channel 22. From this point, the webbing 100 descends to a seat belt retractor 118 secured by a fastener 119 at the bottom end of the right side frame channel 22. This further path of webbing 100 after guide roller 106 to retractor 118 defines an internal belt run which is protectively enclosed in and extends along the frame as seen in FIG. 3. The internal belt run is connected integrally with the external belt run. The retractor 118 normally allows unwinding of the webbing 100 but locks automatically to prevent further unwinding upon deceleration of the seat during vehicle travel.

Although the preferred embodiment shows a seat belt webbing 100 routed through the right side frame channel 22, it should be understood that the invention also contemplates a similar design using the left side frame channel 24.

To use the seat belt structure 12, a seat occupant will take the tongue 104 and pull it across his torso to insert the tongue into the buckle 96. This movement causes the webbing 100 to unwind from the retractor 118 so that the webbing 100 defines a lap belt portion 120 traversing the lap of a seat occupant, and a shoulder belt portion 122 extending diagonally across the upper torso of the seat occupant.

It should now be appreciated that the present invention provides a seating system for integrating a three point safety belt into an emergency vehicle or SCBA seat to be used in fire and rescue vehicles. In particular, the seat 10 employs a frame 14 having a channel 22 which acts as a protective enclosure for the safety belt path to prevent belt abrasion and interference in belt motion. The frame 14 is purposely designed to be symmetrical so that it can be used either on the passenger or driver side of the emergency vehicle. The channels 22, 24 provide the requisite structure to withstand FMVSS (Federal Motor Vehicle Safety Standard) type seat belt loadings with increasing cross section from top to bottom for optimized strength. The channels 22, 24 are angled along the front surface to create an ergonomic seating surface. In addition, the channels 22, 24 provide attachment points for the guide rollers 110, 114, the bolsters 64, 66 and side cushions 68, 70 while preserving the aesthetics on the rear of seat 10. The seating system described above will make the safety belt easier to access and use because of its placement on the seat. The seating system will also allow more flexibility in emergency vehicle cab design due to removal of the upper torso safety belt anchorage.

While the invention has been described with reference to a preferred embodiment those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. In a seat having a frame for supporting a seat cushion and a spaced apart, back cushioning arrangement, and an enclosure connected to the frame adapted to store a self-contained breathing apparatus therein, the improvement wherein:

the frame includes a pair of spaced apart, upright channels, each being C-shaped in cross section and having a pair of inner and outer side walls connected by a rear wall so that each channel is open at a forward end thereof facing the back cushioning arrangement, the back cushioning arrangement having upper hook structure removably engageable with bars extending transversely across the side walls of the channels, and lower hook structure removably engageable with braces extending downwardly and forwardly from the channels, each of the channels having a top end with a cage mounted thereon, one of the cages having a rotating bezel with a guide slot in communication with one of the open, upright channels; and a seat belt structure is connected to the frame and integrated into the seat and has an internal belt run protectively enclosed inside one of the open, upright channels, and an external belt run connected to the internal belt run and extending forwardly to exit the guide slot for travel across the back cushioning arrangement.

2. The seat of claim 1, wherein the back cushioning arrangement is comprised of a pair of bolsters, each extending substantially the entire height of one of the channels and a pair of side cushions, each being received in a recess formed in a respective bolster.

3. The seat of claim 1, wherein the channels have symmetrical structure such that the internal belt run of the seat belt structure may be positioned in either of the channels.

4. The seat of claim 1, wherein each of the channels has increasing cross section from top to bottom.

5. An emergency conveyance seat comprising:

a frame for supporting a seat cushion and a back cushioning arrangement having a clip-on structure, the frame including a pair of spaced apart, upright channels having open ends facing towards the back cushioning arrangement and top ends with cages mounted thereon, either of the cages having a rotating bezel with a guide slot, the channels being connected by an enclosure adapted to receive a self-contained breathing apparatus, the channels providing a fastener-free attachment structure for removably mounting the clip-on structure of the back cushioning arrangement thereon, one of the upright, open channels providing a protective housing for an internal belt run of an elongated seat belt webbing extending from a refractor positioned adjacent a lower end of the one channel up to the guide slot on the rotating bezel, the seat belt webbing including an external belt run connected to the internal belt run and extending forwardly to exit the guide slot for travel across the back cushioning arrangement, the external belt run having one end fixed to a lower end on one side of the frame and a second end removably joined to a lower end on an opposite side of the frame.

6. In a seat having a frame for supporting a seat cushion and a spaced apart, back cushioning arrangement, and an enclosure connected to the frame adapted to store a self-contained breathing apparatus therein, the improvement comprising:

a seat belt structure integrated into the seat and having an internal belt run protectively enclosed inside the frame and an external belt run extending along the back cushioning arrangement, wherein the frame includes a pair of spaced apart channels, each being C-shaped in cross section and having a pair of inner and outer side walls connected by a rear wall so that each channel is open at a forward end thereof, wherein each of the channels has a bar extending transversely across the side walls and the bar provides a mounting structure for upper hook structure on the back cushioning arrangement, and wherein each of the channels has a brace extending downwardly and forwardly therefrom and providing a support surface for lower hook structure on the back cushioning arrangement.

7. The seat of claim 6, including attachment structure disposed internally of the frame for enabling removable mounting of the back cushioning arrangement.

8. The seat of claim 6, wherein the back cushioning arrangement is comprised of a pair of bolsters, each extending substantially the entire height of one of the channels and a pair of side cushions, each being received in a recess formed in a respective bolster.

9. The seat of claim 6, including a pair of cages mounted upon top ends of the channels, one of the cages having a rotating bezel with a guide slot for guiding the seat belt structure therethrough.

10. The seat of claim 6, wherein the channels have symmetrical structure such that the internal belt run of the seat belt structure may be positioned in eight of the channels.

11. the seat of claim 6, wherein each of the channels has increasing cross section from top to bottom.

* * * * *

UNITED STATES PATENT AND TRADEMARK OFFICE
CERTIFICATE OF CORRECTION

PATENT NO. : 6,655,745 B2  Page 1 of 1
DATED : December 2, 2003
INVENTOR(S) : Jeremy A. Fohrenkamm, Paul C. Bostrom and Wayne R. Block It is certified that error appears in the above-identified patent and that said Letters Patent is hereby corrected as shown below:

<u>Column 6,</u>
Line 12, cancel "refractor" and substitute therefor -- retractor --;
Line 59, cancel "eight" and substitute therefor -- each --.
Line 60, cancel "the" and substitute therefor -- The --. First occurrence.

Signed and Sealed this

Fourth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,655,745 B2
DATED          : December 2, 2003
INVENTOR(S)    : Jeremy A. Fohrenkamm et al.

It is certified that error appears in the above-identified patent and that said Letters Patent is hereby corrected as shown below:

<u>Title page,</u>
Item [73], Assignee, add -- H.O. Bostrom Company, Inc., Waukesha, WI --

Signed and Sealed this

Fifteenth Day of June, 2004

JON W. DUDAS
*Acting Director of the United States Patent and Trademark Office*